Feb. 2, 1937.   M. A. PALMER   2,069,536
AUTOMATIC GAUGING STOP FOR SHEARING MACHINES
Filed Oct. 26, 1935
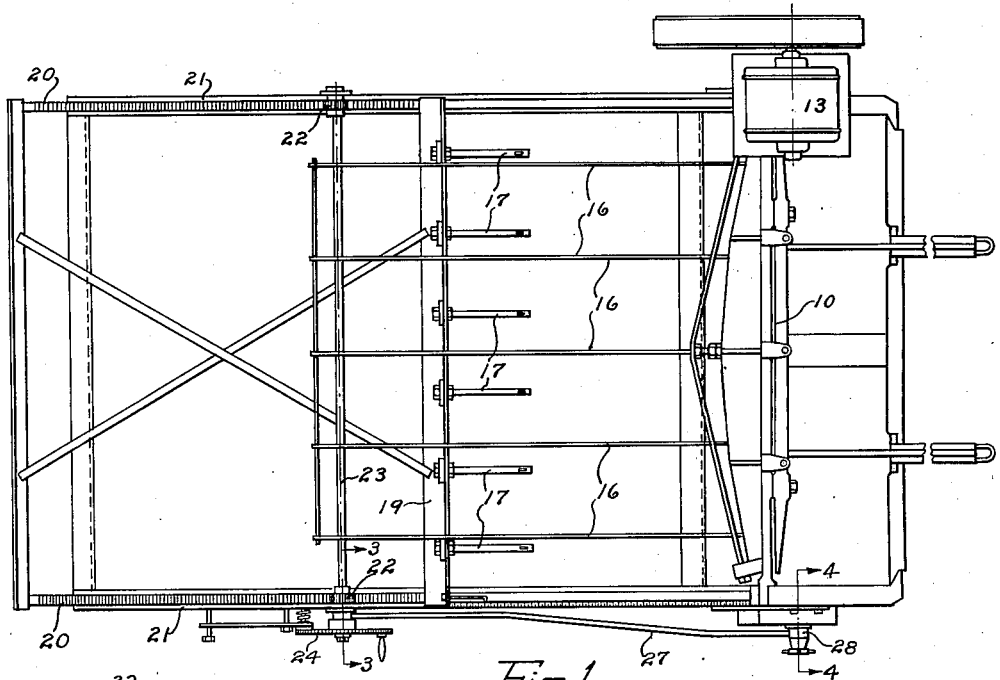
Fig.1
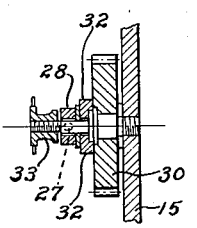
Fig.4
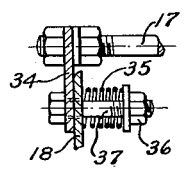
Fig.5
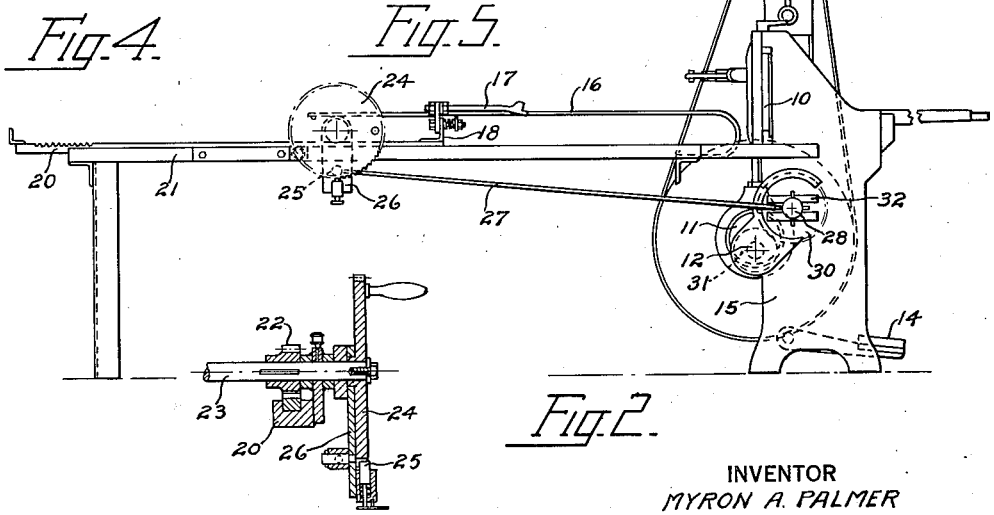
Fig.3
Fig.2
INVENTOR
MYRON A. PALMER
BY O. V. Thiele
ATTORNEY Patented Feb. 2, 1937

2,069,536

UNITED STATES PATENT OFFICE 2,069,536

AUTOMATIC GAUGING STOP FOR SHEARING MACHINES

Myron A. Palmer, Wellsville, N. Y., assignor to The Air Preheater Corporation, New York, N. Y.

Application October 26, 1935, Serial No. 46,903

8 Claims. (Cl. 164—48)

The present invention relates to a shearing machine for cutting plates or sheets and particularly to a gauging stop therefor that is automatically adjustable to cut pieces of varying lengths.

A shears embodying the invention is especially adapted for cutting metal plates serving as heating elements in heat exchange apparatus. One known type of heat exchange apparatus has a cylindrical casing the interior of which is divided by radially disposed partitions to form a number of sector shaped chambers. In each chamber there is provided a set of heating elements consisting of a number of pairs of metal plates disposed so as to extend between the radial partition, the several pairs of a set being located at different distances from the center of the casing. As a consequence, the lengths of the different pairs of plates constituting a set vary in length, and frequently the pairs vary progressively by a like increment of length. That is, a set may consist of a number of plate pairs varying by say one quarter inch; one pair having a length of 19 inches, for example, another pair of 18¾ inches, a pair of 18½ inches etc.

Heretofore, in cutting such sets of heating elements from a sheet of metal it has been necessary to set a stop gauge on the shearing machine to cut a plate of desired length and to then manually reposition the stop after each pair, or other number, of plates has been cut in order to cut other pairs of plates having a different length. It is apparent that this procedure takes up part of the time of the shears operator, or an assistant, and also causes the shears to be inactive temporarily.

An object of the present invention is to provide a shearing machine with a gauging stop that is automatically adjustable to cut pieces of varying length from a sheet of metal.

Another object is to provide means for causing the shears to cut a desired number of pieces of one size and to then automatically condition itself to cut a number of pieces of another size.

Other objects and advantages of the invention will become apparent upon consideration of the following detailed description of an illustrative embodiment thereof and of the appended claims when read in conjunction with the accompanying drawing in which:

Figure 1 is a plan view of a shearing machine embodying the invention;

Figure 2 is a side elevational view corresponding with Figure 1;

Figure 3 is a sectional view on the line 3—3 in Figure 1;

Figure 4 is an enlarged view of that part of the device which determines the increment of stop movement; and Figure 5 is an enlarged view showing one manner of supporting the stops.

Referring to the drawing, the shearing machine comprises a blade 10 vertically reciprocable with respect to a support for a sheet of metal from which plates are to be cut. The blade is actuated by an eccentric 11 on a shaft 12 driven by a motor 13 and is suitably controlled to cut one plate at a time, as by means of a foot pedal 14 acting through a clutch (not shown). At one side of the machine frame 15 the sheet support comprises a number of spaced bars 16 between which are a series of movable gauging stops 17. These stops are located at a level for engagement by the end edge of a sheet on the support. The sheet is fed from the right-hand side of the machine (Figs. 1 and 2) and the distance of the stops 17 to the left of blade 10 determines the length of a plate cut from the sheet by the shears. When a plate has been cut it is removed from the bars 16 before the sheet is fed to the left beneath the blade into engagement with the stops 17 preliminary to cutting the next plate.

The stops 17 are mounted on supports 18 secured to a transverse bar 19 connected at its ends to a pair of slideable racks 21 suitably guided on side members 22 extending from the machine frame. The racks 21 are engaged by pinions 22 on a shaft 23 having a ratchet 24 fixed thereto. The ratchet is actuated by a disengageable plunger type pawl 25 (Fig. 3) carried on an arm 26 loosely mounted on shaft 23. Arm 26 is connected by a link rod 27 to an adjustable eccentric stud 28 on a gear 30 mounted on a stub shaft on the machine frame. Gear 30 meshes with a gear 31 secured to the blade-actuating shaft 12. As shown in Figure 4, stud 28 is adjustably mounted in slides 32 on gear 30, being held in adjusted position by nut 33. Hence the eccentricity of stud 28 may be changed to vary the stroke of pawl 25 and thus variably control the extent or increment of movement of the stops 17 with respect to blade 10 for each rotation of gear 30. The ratio between gears 30 and 31 determines the number of plates in a series of like lengths that are cut from a sheet prior to automatic adjustment of stops 17 to cause a like number of a different length to be cut; a two to one ratio, for example, causing actuation of ratchet 24 once for each two cutting cycles so that two plates of one length may be cut before the stop is automatically positioned for cutting another pair of the next length.

It is apparent that the direction of rotative movement imparted to ratchet 24 determines whether the stops 17 are moved away from the blade for cutting plate series of progressively increasing size or toward the blade to cut series of decreasing size.

To avoid buckling of the plates, or jamming or breakage of the stops, in the event the stops 17 are moved toward blade 10 while the latter is in engagement with the sheet, or when resistance is offered by the stock, the stops are preferably yieldingly mounted on the supports 18. As shown in Figure 5, each stop 17 is attached to a member 34 and a coil spring 35 is mounted between the support 18 and a nut 36 on a bolt 37 that extends through support 18 and the member 34. Thus, on actuation of ratchet 24 to position stops 17 nearer the blade 10 for cutting a smaller plate the support 18 takes up the new position while the stops 17 remain in the old position until the resistance is removed, whereupon the springs 35 act to cause the stops to follow their support. This arrangement also facilitates removal of a piece or plate that has been cut and which bears at one end against the uncut stock and at the other against the stops 17 since the latter may yield to permit removal of the cut piece. If desired the stops 17 may be formed of resilient material adapted to yield under stress.

What I claim is:

1. In a shearing machine having a support for a sheet of material from which pieces are to be cut, a cutting blade, and means for actuating said blade; a stop engageable by a sheet on said support and adjustable with respect to said blade to variably gauge the length of a piece cut from said sheet thereby; and means operable by said blade actuating means for periodically moving said stop with respect to said blade to cause the latter to cut a plurality of pieces varying in length.

2. In a shearing machine having a support for a sheet of material from which pieces are to be cut, a cutting blade, and means for actuating said blade; a stop engageable by a sheet on said support and adjustable with respect to said blade to variably gauge the length of a piece cut from said sheet thereby; means for moving said stop in uniform steps with respect to said blade; and means periodically operable by said blade actuating means for operating said moving means to cause said blade to cut a plurality of pieces varying in length by a determined increment.

3. In a shearing machine having a support for a sheet of material from which pieces are to be cut, a cutting blade, and means for actuating said blade; a stop engageable by a sheet on said support and adjustable with respect to said blade to variably gauge the length of a piece cut from said sheet thereby; means operable by said blade actuating means for periodically moving said stop in uniform steps with respect to said blade to cause the latter to cut a plurality of pieces varying in length by a determined increment; and adjustable means controlling said operating means to determine the extent of the increment of variation in length among said pieces.

4. In a shearing machine having a support for a sheet of material from which pieces are to be cut, a cutting blade, and means for actuating said blade; a stop engageable by a sheet on said support and adjustable with respect to said blade to variably gauge the length of a piece cut from said sheet thereby; means for moving said stop to change its position with respect to said blade; and means controlled by said blade actuating means for operating said moving means after a series of pieces of one length have been cut by said blade to move said stop for causing said blade to cut another series of pieces of another length.

5. In a shearing machine having a support for a sheet of material from which pieces are to be cut, a cutting blade, and means for actuating said blade; a stop engageable by a sheet on said support and adjustable with respect to said blade to variably gauge the length of a piece cut from said sheet thereby; and means controlled by said blade actuating means and operable during actuation of said blade for cutting one piece of material to cause movement of said stop toward said blade so that said blade may cut a shorter piece upon a subsequent actuation.

6. In a shearing machine having a support for a sheet of material from which pieces are to be cut, a cutting blade, means for actuating said blade, and a stop engageable by a sheet on said support to determine the length of a piece cut by said blade; a support for said stop movable with respect to said blade for changing the position of said stop; means operable by said blade actuating means during actuation of said blade to cut one piece of material for moving said stop support toward said blade to cause said blade to cut a shorter piece upon a subsequent actuation; and means yieldingly connecting said stop to said support for permitting said movement of the latter during cutting of one piece by said blade and acting on removal of said one piece for effecting corresponding movement of said stop.

7. In a shearing machine having a frame, a support thereon for a sheet of material from which pieces are to be cut, a cutting blade, blade actuating means, and a stop engageable by the edge of a sheet on said support and movable along the latter with respect to said blade for variably gauging the length of a piece cut from said sheet; a rack carrying said stop and mounted on said frame for movement thereon to change the position of said stop with respect to said blade; a pinion engaging said rack; and means operable by said blade actuating means for periodically operating said pinion to cause a change in the position of said stop.

8. In a shearing machine having a cutting blade, a support for a sheet of material, and means for actuating said blade to cut a piece of material from said sheet; a measuring stop engageable by a sheet on said support and movable to change its position with respect to said blade for determining the length of a piece cut from said sheet by said blade; and means operable by said blade actuating means for moving said stop to automatically change its measuring position with respect to said blade.

MYRON A. PALMER.